June 7, 1960 L. A. HICKS 2,939,241
BAIT HOLDER AND PROTECTOR
Filed Dec. 18, 1958

INVENTOR.
LOY A. HICKS

United States Patent Office 2,939,241
Patented June 7, 1960

2,939,241

BAIT HOLDER AND PROTECTOR

Loy A. Hicks, Rte. 1, Box 448, Shelton, Wash.

Filed Dec. 18, 1958, Ser. No. 781,374

1 Claim. (Cl. 43—41)

The present invention consists of a bait holder and protector adapted to at least partially encompass a bait (usually comprising a longitudinal fish bait which may be in the form of a fish body such as a herring, or the like, although not so limited) in a manner whereby the bait will be effectively protected from damage while being drawn through a body of water, such as during a trolling operation, or the like, thus making it possible to re-use the bait.

Furthermore, the bait holder and protector of the present invention, in one preferred form, includes an angularly directed deflection portion adapted to react with water, when the device is longitudinally moved through the water, in a manner such as to effectively deflect and impart another type of motion to the device simulating the normal movement of a swimming fish of approximately the same size as the bait held by the bait holder and protector of the present invention. In other words, in the preferred form of the invention wherein the bait holder and protector is adapted to carry and at least partially encompass a fish body such as a herring, or the like, it not only acts to protect the herring from damage, such as normally occurs as a result of mount and gill damage when such a herring is drawn fairly rapidly through water during a trolling operation, but it also acts to cause both the bait holder and protector and the herring carried thereby to move in the water in a manner which appears very much like the normal swimming movement of a live herring, thus tending to deceive a game fish into believing that it is actually a live herring, and causing it to take the bait.

Furthermore, the protective aspect of the bait holder and protector of the present invention acts to very effectively protect the herring so that it may be used several times.

Furthermore, the preferred form of the present invention, just referred to, includes a novel means for fastening the herring or the like in the bait holder and protector by means of a double strand portion of a fish line leader looped around the tail of the herring and drawing it tightly against one side of the novel bait holder and protector of the present invention, thus providing firm attachment of the herring without damage thereto.

It is an object of the present invention to provide a novel holder and protector for fish bait adapted to at least partially encompass the fish bait within a transparent holding member of thin-sheet material (preferably plastic, although not so limited).

It is a further object of the present invention to provide an improved bait holder and protector of the character set forth in the preceding object, including an angularly directed deflection portion, preferably at the rear of the bait holder and protector, adapted to effectively cause the entire bait holder and protector to simulate the normal swimming movements of a herring, or other small bait fish, when the device is drawn through the water by a leader atached to a fish line, such as would normally occur during a trolling operation, or the like, although not so limited.

It is a further object of the present invention to provide a bait holder and protector of the type set forth in any of the preceding objects, which is of exceedingly simple, cheap, molded plastic construction whereby to facilitate widespread use of the device.

Further objects will be apparent to persons skilled in the art after a careful study hereof.

For the purpose of clarifying the nature of the present invention, two exemplary embodiments are illustrated in the hereinbelow-described figures of the accompanying drawing and are described in detail hereinafter.

Fig. 1 is a perspective view of one exemplary form of the invention with a fish line leader and hook means shown in pre-baiting position with the leader engaged with attachment aperture means at the front and rear of the device. In other words, the entire device is in the position preliminary to the insertion of a longitudinal fish bait, such as a herring or the like, thereinto for fastening with respect thereto in the manner clearly shown in the reduced-size bottom view illustrated in Fig. 5.

The bait holdesr and protector of the present invention includes a holding member of transparent thin-sheet material having two laterally spaced rearwardly directed side portions adapted to engage at least portions of opposite sides of a bait therebetween, and further having an interconnecting front portion integrally attached to the front end of each of said side portions. In the specific example illustrated in Figs. 1–5, the holding member is indicated generally at 10, a first one of the side portions is indicated at 11, a second one of the side portions is indicated at 12, and the interconnelting front portion is indicated at 13; the entire holding member 10 being made of molded transparent plastic thin-sheet material such as an acrylic resin of the type commonly known as "Lucite" or "Plexiglass" or any other suitable material.

Figure 5:
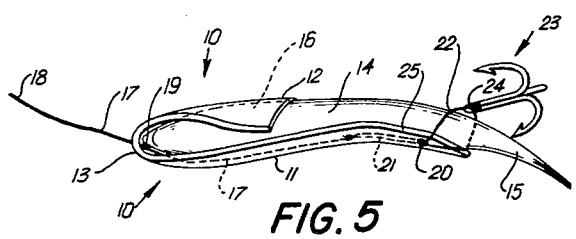
Fig. 5 is a reduced-size bottom view of the bait holder and protector illustrated in Figs. 1–4 showing the device after a herring has been inserted head first thereinto and has its tail portion firmly fastened by means of the looped double strand portion of the fish line leader engaged around the tail of the herring.

Also, it should be noted that, in the specific embodiment illustrated in Figs. 1–5, the first side portion 11 extends rearwardly a length substantially equivalent to the normal length of a longitudinal fish bait such as the fish body 14 (exclusive of the extreme tail tip portion 15 of the fish body 14) and is of a vertical height such as to engage a very substantial portion of one side of the longitudinal fish bait or body 14, as best seen in Fig. 5.

Also, it should be noted that, in the specific example illustrated in Figs. 1–5, the second side portion 12 extends rearwardly to a considerably lesser degree than the first side portion 11, although it extends vertically to substantially the same degree. Furthermore, the second side portion 12 is partially inwardly concave adjacent its rear edge and is adapted to engage the head and gill portion of the fish body 14 in the region indicated generally at 16 whereby to effectively protect the head and gill portion of the herring or fish body 14 so that they will not be damaged when the entire holding member 10 and the fish body 14 are drawn through a body of water in the direction of the fish line leader 17 during a trolling operation, or other fishing operation resulting in forward movement of the entire holder 10 and fish body 14.

It should further be noted that the leader 17 has a fastening end 18 which is adapted to be fastened to a fish line (not shown). Furthermore, it should be noted that the holding member 10 is provided with attachment means for effectively attaching the fish line leader and, therefore, a fish line (not shown) thereto.

Figure 1:
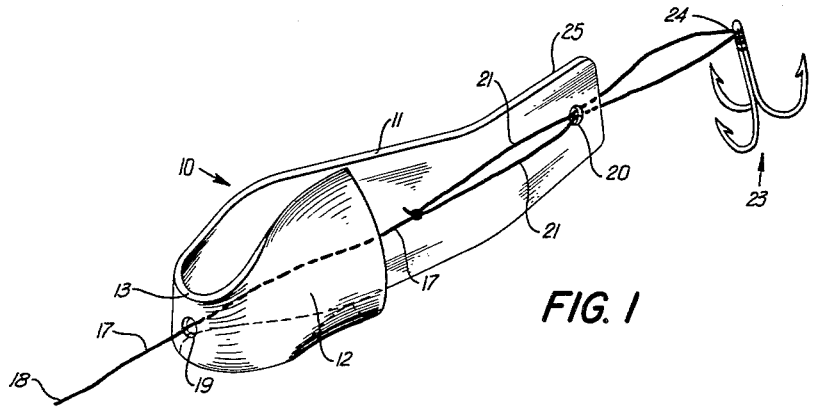
Figure 2:
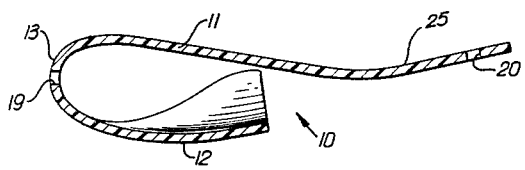
Fig. 2 is a longitudinal sectional view taken in the direction of the arrows 2—2 in Fig. 3.
Figure 3:
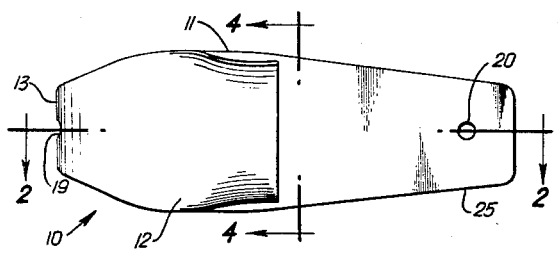
Fig. 3 is a side elevational view of the device.
Figure 4:
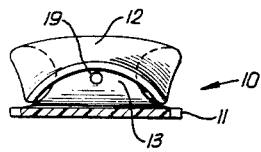
Fig. 4 is a view, partly in elevation and partly in vertical section, taken in the direction of the arrows 4—4 in Fig. 3.

In the specific example illustrated in Figs. 1–5, said attachment means takes the form of attachment aperture means 19 carried by the front portion 13 of the holding member 10 and another attachment aperture means 20 carried by the rear end of the first side portion 11 of the holding member 10; each of the attachment aperture means 19 and 20 being adapted to receive therethrough the fish line leader 17 in the manner clearly shown in Figs. 1 and 5 with the fastening end 18 of the fish line leader 17 extending forwardly from the front portion 13 of the holding member 10 and with an intermediate portion of the leader 17 extending between the fish body 14 carried by the holding member 10 (as seen in Fig. 5) and said first side portion 11 of the holding member 10, and with a double strand portion 21 of the leader 17 extending laterally through the rear attachment aperture means 20, as shown in the preliminary prebaiting position of Fig. 1, and then being reversely looped around a tail portion of the fish body 14 in the manner clearly indicated at 22 in Fig. 5 whereby to tightly hold the fish body 14 against the inside of the first side portion 11 of the holding member 10, with the hook means, indicated generally at 23 and carried by a hook end 24 of the leader 17, positioned closely adjacent to the rear end of both the fish body 14 and the side portion 11 of the holding member 10, as is clearly shown in Fig. 5.

Also, in one preferred form of the present invention, the side portion 11 may include an angularly directed deflection portion 25 adapted to react with water, when the holding member 10 is longitudinally moved therethrough, to effectively deflect and impart another type of motion to the holding member 10 simulating normal movement of a swimming fish of the type used as bait, such as the herring 14 or the like.

It will readily be understood that the application of tension to the fastening end 18 of the leader 17 will cause the entire assembly shown in Fig. 5 to be drawn through the water with a movement closely simulating the swimming motions of a live herring, while the device effectively protects the herring body 14 from damage, thus providing a very effective fish lure which can be used repeatedly by reason of the effective protection of the body of the herring provided by the device.

Figure 6:
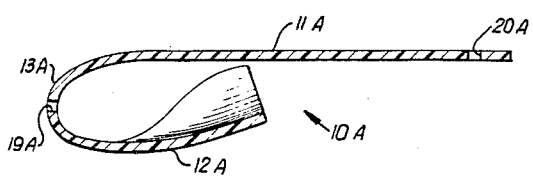
Fig. 6 is a longitudinal central sectional view similar to Fig. 2 but illustrating a slightly modified form of the invention wherein the rear end of the longer one of the side portions is straight and does not have an angularly directed deflection portion of the type clearly shown in the first form of the invention illustrated in Figs. 1–5.

Fig. 6 illustrates a slightly modified form of the invention wherein all portions of the apparatus are the same as in the first form of the invention illustrated in Figs. 1–5 except that there is no angularly directed deflection portion comparable to the element 25 shown in the first form of the invention. Portions of this modification of the invention similar to the first form of the invention are indicated by the same reference numerals followed by the letter "A". This modification is primarily intended for use where what is known in the art as a "flasher" or other equivalent device is adapted to be positioned ahead of the holding member 10A connected to either a leader of a type similar to that indicated at 17 in the first form of the invention or connected to a fish line (not shown). In other words, by reason of the use of such a "flasher," the deflection portion is not required in this modification of the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

A bait holder and protector, comprising: a holding member of transparent thin-sheet plastic material and including two laterally spaced rearwardly directed side portions adapted to engage at least portions of opposite sides of a bait in the form of a fish body when inserted therebetween and including an interconnecting front portion integrally attached to the front end of each of said side portions, a first one of said side portions extending rearwardly a length substantially equivalent to the normal length of the fish body adapted to be carried by the holding member and being of a height such as to engage a very substantial portion of one side of the fish body carried by the holding member, and a second one of said side portions extending rearwardly and vertically to an extent such as to engage the head and gill portion of the opposite side of the fish body carried by the holding member, said first side portion having an angularly directed deflection portion at the rear thereof extending angularly away from said second side portion and adapted to react with water when the holding member is longitudinally moved therethrough to effectively deflect and impart motion to the holding member simulating normal movement of a swimming fish of the type used as bait, said second side portion being at least partially inwardly concave, a fish line leader having a fastening end adapted to be fastened to a fish line, having a double strand portion, and having a hook end provided with hook means; said front portion and the rear end of said first side portion being provided with attachment aperture means receiving therethrough said fish line leader with said fastening end extending forwardly from the front portion of said holding member, with an intermediate portion of said leader extending between the fish body carried by the holding member and said first side portion thereof, with said double strand portion of said leader extending laterally through the rear attachment aperture means and being reversely looped around a tail portion of the fish body carried by the holding member whereby to hold it tightly against the inside of said first side portion of the holding member with said hook means closely adjacent thereto.

References Cited in the file of this patent

UNITED STATES PATENTS 2,780,022    Arntzen _____ Feb. 5, 1957

FOREIGN PATENTS 4,129    Great Britain _____ 1903